(12) United States Patent
Inoue et al.

(10) Patent No.: US 7,886,324 B1
(45) Date of Patent: Feb. 8, 2011

(54) RECEIVING SYSTEM FOR DIGITAL BROADCASTING AND RECEIVING APPARATUS FOR DIGITAL BROADCASTING

(75) Inventors: Hajime Inoue, Chiba (JP); Tatsuya Wakahara, Tokyo (JP); Naoki Murayama, Tokyo (JP); Masao Mizutani, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/466,279

(22) Filed: Dec. 17, 1999

(30) Foreign Application Priority Data

Dec. 22, 1998 (JP) .............................. P10-364787

(51) Int. Cl.
*H04N 7/173* (2006.01)
*H04L 12/28* (2006.01)
*G06F 13/42* (2006.01)
*G06F 15/16* (2006.01)

(52) U.S. Cl. .............................. 725/80; 725/74; 725/78; 725/82; 710/10; 370/245; 370/257; 709/222

(58) Field of Classification Search .................... 725/58, 725/59, 151, 153, 131, 133, 37, 71, 80, 81, 725/141, 82, 74, 78; 370/475, 257, 245; 710/10, 11; 709/222
See application file for complete search history.

(56) References Cited

U.S. PATENT DOCUMENTS

| | | | |
|---|---|---|---|
| 5,548,722 A | | 8/1996 | Jalalian et al. |
| 5,764,930 A | * | 6/1998 | Staats .......................... 710/107 |
| 5,825,752 A | * | 10/1998 | Fujimori et al. ............. 370/260 |
| 6,160,796 A | * | 12/2000 | Zou ............................. 370/257 |
| 6,219,697 B1 | * | 4/2001 | Lawande et al. ............ 709/221 |
| 6,333,739 B1 | * | 12/2001 | Koyama et al. ............. 345/744 |
| 6,507,953 B1 | * | 1/2003 | Horlander et al. ........... 725/105 |
| 6,574,612 B1 | * | 6/2003 | Baratti et al. ................. 705/59 |

(Continued)

FOREIGN PATENT DOCUMENTS

EP    0 853 402 A2    7/1998

(Continued)

OTHER PUBLICATIONS

R.H.J. Bloks, "The IEEE-1394 High Speed Serial Bus", Philips Journal of Research, vol. 50, No. ½, 1996, pp. 209-216.

*Primary Examiner*—Christopher Kelley
*Assistant Examiner*—Reuben M Brown
(74) *Attorney, Agent, or Firm*—Lerner, David, Littenberg, Krumholz & Mentlik, LLP

(57) ABSTRACT

In a system in which an IEEE 1394 interface is provided for an IRD, connected equipment can be easily selected and the operability is improved. Data can be transmitted among the equipment by providing the IEEE 1394 interface for the IRD. For example, five equipment units are selected from the equipment connected to the IEEE 1394 interface and node ID numbers are allocated to the five equipment units and registered. Thus, even if the equipment is removed from the interface and connected again, the IRD can recognize the equipment. The registration may easily be changed by user input. When the registration is changed, the change of the registration is inhibited among equipment units in which a program reservation has been set or the connected equipment. Thus, even if the registration is changed, an erroneous operation does not occur.

18 Claims, 10 Drawing Sheets

U.S. PATENT DOCUMENTS

| | | | |
|---|---|---|---|
| 6,996,073 B2 * | 2/2006 | West et al. | 370/260 |
| 2002/0042855 A1 * | 4/2002 | Takayama et al. | 710/105 |
| 2002/0089531 A1 * | 7/2002 | Hirasawa | 345/735 |
| 2003/0172201 A1 * | 9/2003 | Hatae et al. | 710/8 |

FOREIGN PATENT DOCUMENTS

| | | |
|---|---|---|
| EP | 853402 A2 * | 7/1998 |
| JP | 9-154077 A | 6/1997 |
| JP | 9-331342 A | 12/1997 |
| JP | 10-243022 A | 9/1998 |
| JP | 10-336765 A | 12/1998 |
| WO | WO 97/49057 | 12/1997 |

\* cited by examiner

Fig. 6A

| | | |
|---|---|---|
| ☑ D-VHS1 | ABC | DVX-10000 |
| ☑ D-VHS2 | DEF | |
| ☑ D-VHS3 | GHI | DVX-10000 |
| ☐ D-VHS | ABC | DVX-10000 |
| ☐ D-VHS | DEF | |
| ☑ MD1 | ABC | DVX-10000 |
| ☑ MD2 | GHI | DVX-10000 |
| ☐ MD | ABC | DVX-10000 |
| ☐ PC CANNOT BE OPERATED | | |

- 72A (checkbox indicator)
- 71: ○ D-VHS1, ○ D-VHS2, ○ D-VHS3, ○ MD1, ○ MD2
- 72 (table)
- 73: DECIDE
- 74: RETURN

Fig. 6B

| | | |
|---|---|---|
| ☑ D-VHS1 | ABC | DVX-10000 |
| ⊙ D-VHS2 | DEF | |
| ☑ D-VHS3 | GHI | DVX-10000 |
| ☐ D-VHS | ABC | DVX-10000 |
| ☐ D-VHS | DEF | |
| ☑ MD1 | ABC | DVX-10000 |
| ☑ MD2 | GHI | DVX-10000 |
| ☐ MD | ABC | DVX-10000 |
| ☐ PC CANNOT BE OPERATED | | |

- 75 (indicator)
- 71: ○ D-VHS1, ○ D-VHS2, ○ D-VHS3, ○ MD1, ○ MD2
- 72 (table)
- 73: DECIDE
- 74: RETURN

Fig. 7A

SET EQUIPMENT

| | | |
|---|---|---|
| ☑ D-VHS1 | ABC | DVX-10000 |
| ☑ D-VHS2 | DEF | |
| ☑ D-VHS3 | GHI | DVX-10000 |
| ☐ D-VHS | ABC | DVX-10000 |
| ☐ D-VHS | DEF | |
| ☑ MD1 | ABC | DVX-10000 |
| ☑ MD2 | GHI | DVX-10000 |
| ☐ MD | ABC | DVX-10000 |
| ☐ PC | CANNOT BE OPERATED | |

71:
- ○ D-VHS1
- ○ D-VHS2
- ○ D-VHS3
- ○ MD1
- ○ MD2

73 — DECIDE
74 — RETURN
72

Fig. 7B

SET EQUIPMENT

| | | |
|---|---|---|
| ☑ D-VHS1 | ABC | DVX-10000 |
| ☐ D-VHS | DEF | |
| ☑ D-VHS3 | GHI | DVX-10000 |
| ☐ D-VHS | ABC | DVX-10000 |
| ☐ D-VHS | DEF | |
| ☑ MD1 | ABC | DVX-10000 |
| ☑ MD2 | GHI | DVX-10000 |
| ☐ MD | ABC | DVX-10000 |
| ☐ PC | CANNOT BE OPERATED | |

71:
- ○ D-VHS1
- ○ D-VHS3
- ○ MD1
- ○ MD2

73 — DECIDE
74 — RETURN
72

Fig. 7C

SET EQUIPMENT

| | | |
|---|---|---|
| ☑ D-VHS1 | ABC | DVX-10000 |
| ☐ D-VHS | DEF | |
| ☐ D-VHS3 | GHI | DVX-10000 |
| ☐ D-VHS | ABC | DVX-10000 |
| ☐ D-VHS | DEF | |
| ☑ MD1 | ABC | DVX-10000 |
| ☑ MD2 | GHI | DVX-10000 |
| ☑ MD3 | ABC | DVX-10000 |
| ☐ PC | CANNOT BE OPERATED | |

71:
- ○ D-VHS1
- ○ D-VHS3
- ○ MD1
- ○ MD2
- ○ MD3

73 — DECIDE
74 — RETURN
72

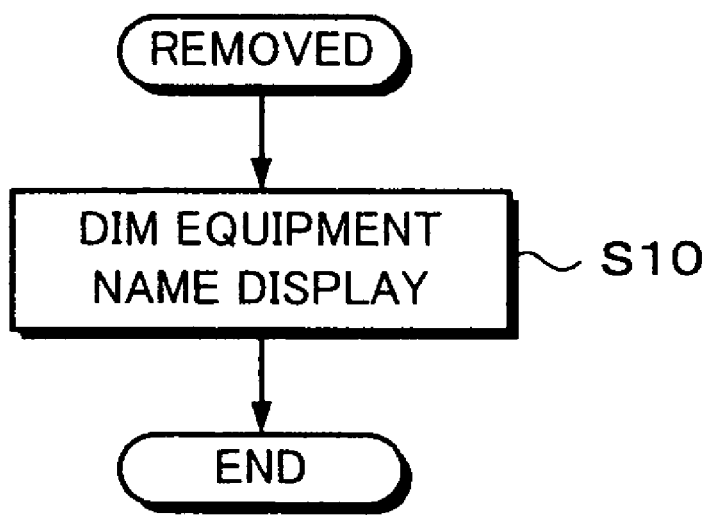

RECEIVING SYSTEM FOR DIGITAL BROADCASTING AND RECEIVING APPARATUS FOR DIGITAL BROADCASTING

BACKGROUND OF THE INVENTION

The invention relates to a receiving system for receiving a digital broadcast signal in which, for example, video data and audio data are broadcasted by a transport stream of an MPEG (Moving Picture Experts Group) 2 system and transmitting the transport stream to digital signal processing equipment through an interface of IEEE (Institute of Electrical Electronic Engineers) 1394. The invention also relates to a receiving apparatus for a digital broadcasting which is used for such a system.

In recent years, IEEE 1394 has gained popularity as an interface to transfer video data and audio data between digital video equipment and digital audio equipment at a high speed. IEEE 1394 supports an isochronous transfer mode and an asynchronous transfer mode. A delay time of a data transfer is guaranteed in the isochronous transfer mode. The isochronous transfer mode is suitable to transfer a time-sequential data stream such as video data or audio data at a high speed. The asynchronous transfer mode is suitable to transfer ordinary data such as various commands or the like.

In recent years, digital satellite broadcasting has also gained in popularity. In the digital satellite broadcasting, a digital video signal and an audio signal are compressed by an MPEG2 system, multiplexed into a packet stream, and transmitted. A digital satellite broadcast signal is typically received by an IRD (Integrated Receiver Decoder) which is connected to a television receiver. A desired program signal is selected by the IRD and a video signal and an audio signal are decoded. An output of the IRD may then be supplied to the TV receiver.

A method of providing an IEEE 1394 interface on an IRD to receive such a digital satellite broadcast signal has been proposed. When an IEEE 1394 interface is provided for an IRD, the IRD is connected to a digital video recording and reproducing apparatus or an MD recording and reproducing apparatus through the IEEE 1394 interface and a receiving system so that the digital satellite broadcast signal can be constructed.

In accordance with the IEEE 1394 standard, when data is transferred, an ID number of a node is allocated and a partner is designated by the ID number of the node. The node ID numbers which can be allocated to a bus of IEEE 1394 are "0" to "63." The last node number among them is used for broadcasting. Now, assuming that broadcast is not used, then up to 63 equipment units can be connected to one bus.

In case of constructing a receiving system for digital satellite broadcasting by using an IRD having an IEEE 1394 interface as mentioned above, a method whereby the ID numbers of the nodes are allocated for up to 63 equipment units in accordance with the IEEE 1394 standard to thereby enable data to be transmitted to such equipment is considered.

Generally, in the receiving system for the digital satellite broadcasting, however, it is hard to consider a situation where 63 equipment units are connected to the IEEE 1394 bus and used. Thus, it is generally accepted that the number of equipment that will be connected to the IEEE 1394 bus is equal to or less than 5. In addition, if up to 63 equipment units can be connected in accordance with the IEEE 1394 standard, efficiency deteriorates. For example, when recording is desired, equipment to record is selected. In this instance, if the number of equipment that is be connected is larger than the number of equipment units actually used, a number of equipment units are arranged on a selection display picture plane and it is difficult to select the desired equipment.

A GUI picture plane showing operations and control states of a plurality of equipment units connected to a bus of IEEE 1394 is disclosed in U.S. Pat. Nos. 5,793,366 and 5,883,621. By observing the GUI picture plane, the user can visually recognize which equipment is presently connected to the IEEE 1394 bus, from which equipment and to which equipment data is transmitted, and further, to which equipment the recording is performed. According to those patents, however, the IRD can recognize only the equipment connected to the IEEE 1394 bus and, once such equipment is disconnected, the equipment can no longer be recognized. Therefore, each time equipment is connected to the IEEE 1394 bus, such equipment has to be set and recognized on the IEEE 1394 bus.

SUMMARY OF THE INVENTION

It is, therefore, an object of the invention to provide a receiving apparatus for a digital broadcasting, in which in the case where a plurality of equipment units are connected to the interface of IEEE 1394, the operability is improved and the equipment connected to the interface of IEEE 1394 are disconnected, and even if they are connected again, the equipment can be recognized without setting the equipment which is connected.

According to the invention, there is provided a receiving apparatus for a digital broadcasting for receiving a digital broadcasting which is transmitted by a transport stream in which video data and audio data have been compressed and multiplexed, comprising: a decoder for decoding the transport stream; a digital interface for transmitting and receiving the transport stream to/from digital signal processing equipment; and a register for selecting a predetermined number of equipment units among a plurality of digital signal processing equipment connected to the digital interface and allocating ID numbers to the selected equipment.

Although up to 63 equipment units can be connected to the interface of IEEE 1394, for example, five equipment units are selected among them and node ID numbers are allocated to the selected five equipment units and registered. Thus, the equipment can be easily selected.

The above and other objects and features of the present invention will become apparent from the following detailed description and the appended claims with reference to the accompanying drawings.

BRIEF DESCRIPTION OF THE DRAWINGS

FIGS. 6A and 6B are schematic diagrams of a setting display on the IRD in a receiving system for digital satellite broadcasting to which the invention is applied;

FIGS. 7A to 7C are schematic diagrams of a setting display on the IRD in a receiving system for digital satellite broadcasting to which the invention is applied;

FIGS. 8A and 8B are flowcharts for registration of equipment in a receiving system for digital satellite broadcasting to which the invention is applied;

DETAILED DESCRIPTION

Figure 1:
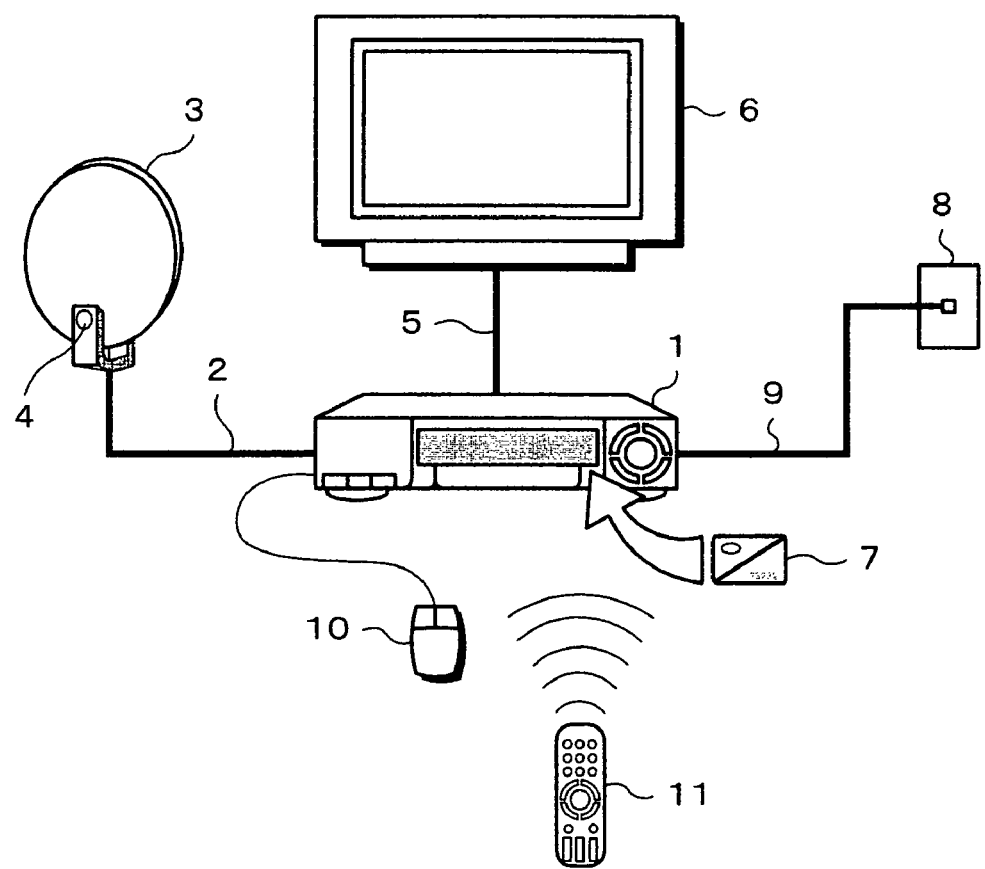
FIG. 1 is a schematic diagram of an example of a receiving system for digital satellite broadcasting to which the invention is applied.

An embodiment of the invention will now be described hereinbelow with reference to the drawings. In FIG. 1, reference numeral 1 denotes an integrated receiver decoder (IRD). The IRD 1 decodes a signal received from a digital satellite broadcasting system and forms a video signal and an audio signal, for example, for the NTSC system. An antenna terminal of the IRD 1 is connected through a cable 2 to a low-noise converter 4 attached to a parabolic antenna 3. A radio wave from a satellite is transmitted within, for example, a frequency band of 12 GHz. The radio wave from the satellite is received by the parabolic antenna 3 and converted into a signal operating in, for example, a frequency band of 1 GHz by the low-noise converter 4 attached to the parabolic antenna 3.

An output of the low-noise converter 4 is supplied to the antenna terminal of the IRD 1 through the cable 2. In the IRD 1, a signal of a desired carrier wave is selected from the reception signal and a transport stream of MPEG2 is demodulated. A video packet and an audio packet of a desired program are extracted from the transport stream and decoded. For example, the video signal and audio signal of the NTSC system are decoded.

The video signal and audio signal from the IRD 1 are supplied to a television receiver 6 through a cable 5. A reception picture plane of a desired satellite broadcasting program is displayed and its audio sound is generated by the TV receiver 6.

An IC card 7 is inserted into the IRD 1. Reception information is stored into the IC card 7. The IRD 1 is connected to a telephone line distributor 8 through a cable 9 and charging information is sent to the IRD 1 through a telephone line.

The IRD 1 is operable by a remote controller 11. When a video mouse 10 is attached, the user can set a reservation program while observing the picture plane which is displayed to the TV receiver 6.

Figure 2:
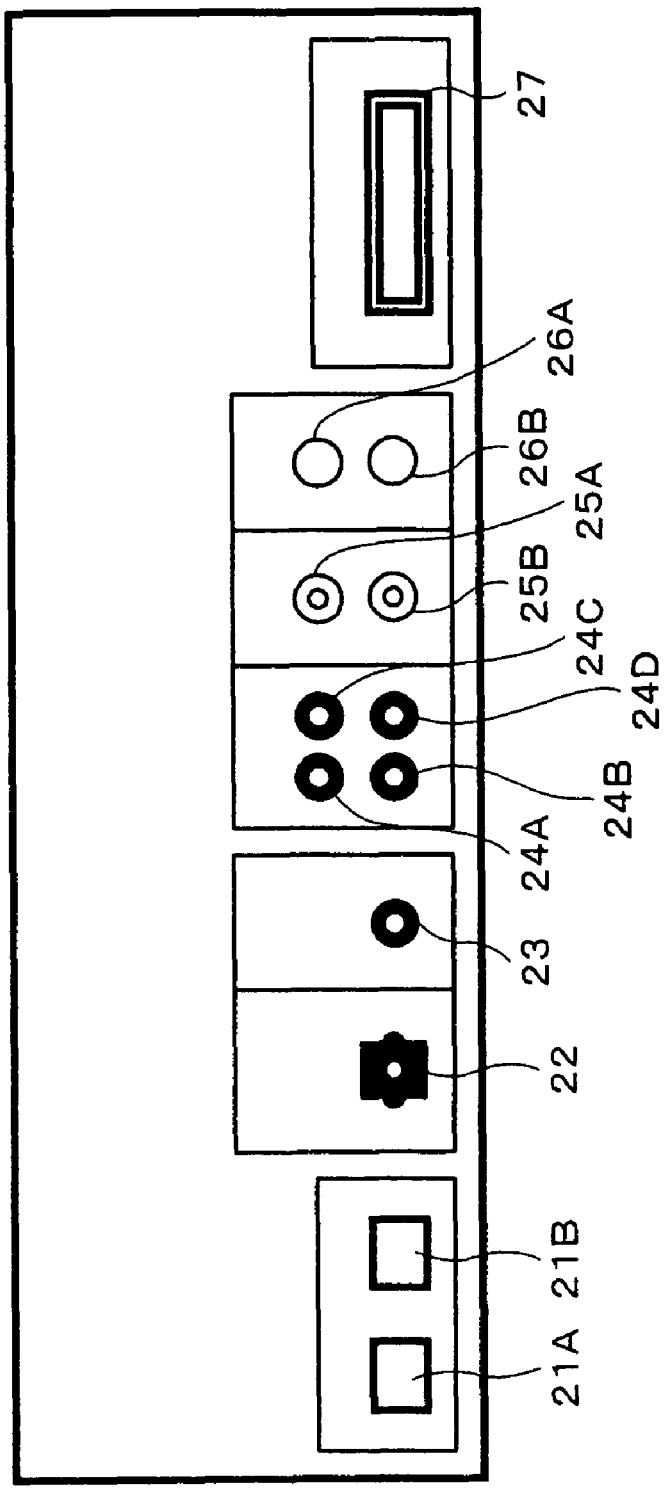
FIG. 2 is a rear view showing a rear panel of an IRD in a receiving system for digital satellite broadcasting to which the invention is applied.

As shown in FIG. 2, a rear panel of the IRD 1 is equipped with: terminals 21A and 21B of IEEE 1394; an optical digital audio output terminal 22; an MD mouse terminal 23; analog audio output terminals 24A to 24D; video output terminals 25A and 25B; S video output terminals 26A and 26B; and a data output high-speed parallel terminal 27.

The terminals 21A and 21B of IEEE 1394 are provided to perform a data transfer by using the IEEE 1394 interface. An isochronous transfer mode and an asynchronous transfer mode are supported by the IEEE 1394 standard. A delay time of a data transfer is guaranteed in the isochronous transfer mode. In the isochronous transfer mode, a time-sequential data stream such as video data or audio data can be transferred at a high speed. In the asynchronous transfer mode, data such as various commands or the like is transferred.

A digital audio signal is outputted from the optical digital audio output terminal 22 by using an optical cable of IEC958. The optical digital audio output terminal 22 is used to connect digital audio equipment or the like having the optical cable of IEC958. The analog audio output terminals 24A to 24D are used to output an analog audio signal. The video output terminals 25A and 25B and S video output terminals 26A and 26B are used to output a demodulated video signal.

Figure 3:
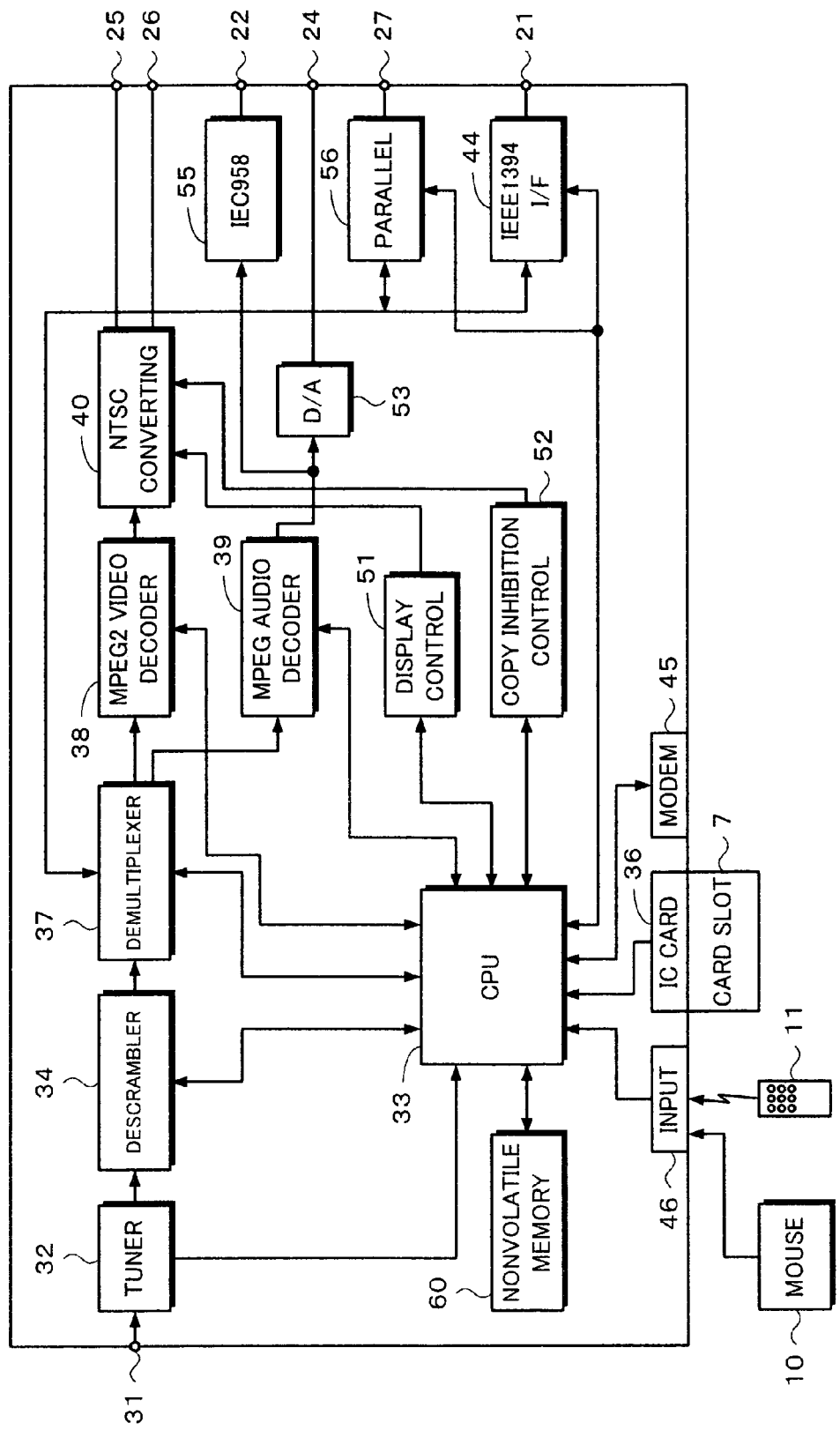
FIG. 3 is a block diagram of the IRD in a receiving system for digital satellite broadcasting to which the invention is applied.

FIG. 3 shows a construction of the IRD 1. As shown in FIG. 1, a radio wave of a digital satellite broadcasting transmitted in a frequency band of, for instance, 12 GHz through a satellite is received by the parabolic antenna 3 and converted into a signal in a frequency band of 1 GHz by the low-noise converter 4 attached to the parabolic antenna 3. An output of the low-noise converter 4 is supplied to an antenna terminal 31 of the IRD 1 through the cable 2. A signal from the antenna terminal 31 is supplied to a tuner circuit 32.

The tuner circuit 32 comprises: a frequency selecting circuit to select a signal of a predetermined carrier frequency from the reception signal; a demodulating circuit for performing a QPSK (Quadrature Phase Shift Keying) demodulating process; and an error correction processing circuit. In the tuner circuit 32, a signal of a desired carrier frequency is selected from the reception signal on the basis of a setting signal from a control CPU (Central Processing Unit) 33. The reception signal is QPSK (Quadrature Phase Shift Keying) demodulated and, further, subjected to an error correcting process.

An output of the tuner circuit 32 is supplied to a descrambler 34. Received ECM (Entitlement Control Message) data and EMM (Entitlement Management Message) data are inputted to a descrambler 34. Key data for descrambling stored in the IC card 7 inserted in an IC card slot 36 is also supplied. The descrambler 34 descrambles an MPEG transport stream by using the received ECM data and EMM data and the key data of the IC card 7. The descrambled transport stream of MPEG2 is sent to a demultiplexer 37.

The demultiplexer 37 separates a desired packet from the stream from the descrambler 34 on the basis of a command from the CPU 33. A packet identifier (PID) is provided in a header portion of the transmitted packet. The demultiplexer 37 extracts a video packet and an audio packet of a desired program on the basis of the PID. The video packet of the desired program is sent to an MPEG2 video decoder 38. The audio packet is sent to an MPEG audio decoder 39.

The MPEG2 video decoder 38 receives the packet of the video signal from the demultiplexer 37 and performs a decoding process of the MPEG2 system, thereby forming video data. The video data is supplied to an NTSC converting circuit 40. In the NTSC converting circuit 40, the video data decoded by the MPEG2 video decoder 38 is converted into a video signal compatible with the NTSC system.

A display control circuit 51 and a copy inhibition control circuit 52 are provided for the NTSC converting circuit 40. The display control circuit 51 allows various display picture planes to be generated on a screen. The copy inhibition control circuit 52 generates a copy inhibition control signal as necessary in order to protect the copyright of a video image.

An output of the NTSC converting circuit 40 is supplied to the analog video output terminals 25 and S video output terminals 26. An analog video signal of the NTSC system is outputted from the analog video output terminals 25 and an S video signal is outputted from the S video output terminals 26.

The MPEG audio decoder 39 receives the audio packet from the demultiplexer 37 and performs an audio decoding process of the MPEG system, thereby forming audio data before data compression. The decoded audio data is outputted from the optical digital audio output terminal 22 through an IEC958 interface circuit 55, converted into an analog audio signal by a D/A converter 53, and thereafter, supplied to the analog audio output terminals 24.

An input to the IRD 1 is supplied from an input unit 46. The remote controller 11, a video mouse, or the MD mouse 10 is prepared as an input by input unit 46. A modem 45 is provided and charging or billing information is sent by the modem 45 via a telephone line.

A carrier frequency of the reception signal is set on the basis of a channel setting signal inputted by the viewer. When a desired program is set, a receiving frequency of the tuner circuit 32 is set to a predetermined carrier frequency by referring to an NIT (Network Information Table). A packet of the PID in a PMT (Program Map Table) as information regarding a desired channel is extracted with reference to a PAT (Program Association Table) as information regarding a channel at the carrier frequency. The video image, audio sound, and PID of a packet of additional data of a desired channel are obtained by referring to the PMT.

An interface 44 of IEEE 1394 is provided for the IRD 1. A transport stream or PCM audio data can be inputted and outputted between the demultiplexer 37 and interface 44 of IEEE 1394.

An interface 56 for high-speed parallel data is further provided for the IRD 1. The transport stream or PCM audio data can be inputted and outputted through the high-speed parallel data interface 56.

Figure 4:
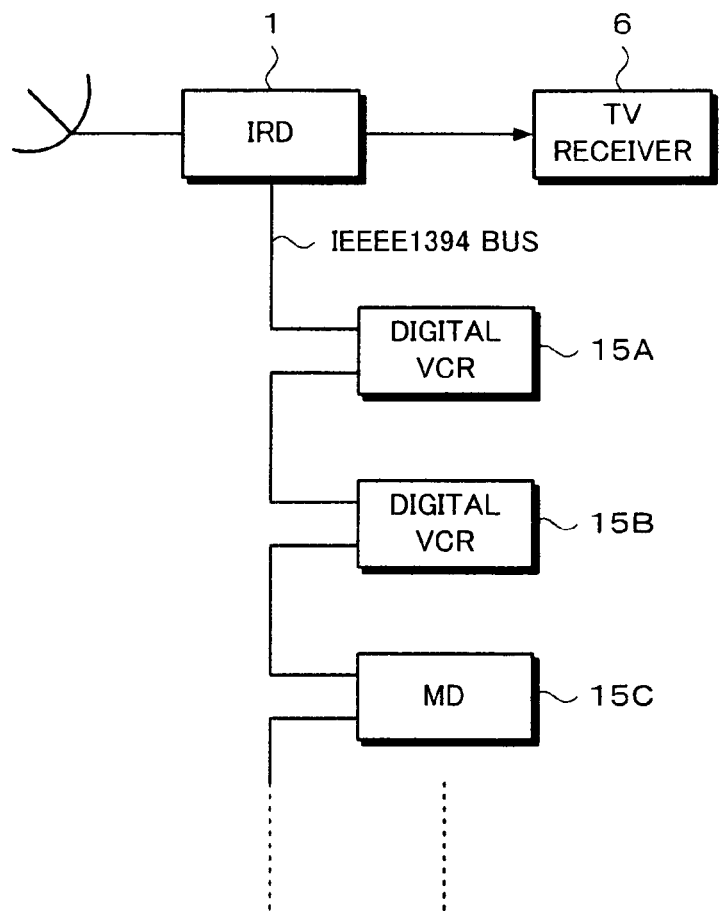
FIG. 4 is a block diagram for use in explaining the receiving system for digital satellite broadcasting to which the invention is applied.

As mentioned above, the interface 44 of IEEE 1394 is provided for the IRD 1 to which the invention is applied. By using the interface 44 of IEEE 1394, as shown in FIG. 4, other digital equipment 15A, 15B, 15C, . . . which can perform the digital recording, for example, a digital video recording and reproducing apparatus, an MD recording and reproducing apparatus, and the like are connected to the IRD 1.

In IEEE 1394 standard, "0" to "63" are available as node ID numbers. The last node number "63" among them is used as a broadcasting channel. The ID number of the node is automatically allocated when the equipment is connected to the bus of the IEEE 1394 interface. In this instance, up to five equipment units among the equipment connected to the bus are registered and the ID numbers of the nodes are allocated to the registered equipment and stored into a nonvolatile memory 60 in correspondence to the registered equipment. The number of corresponding equipment units which are connected is limited to 5 or less.

Figure 5:
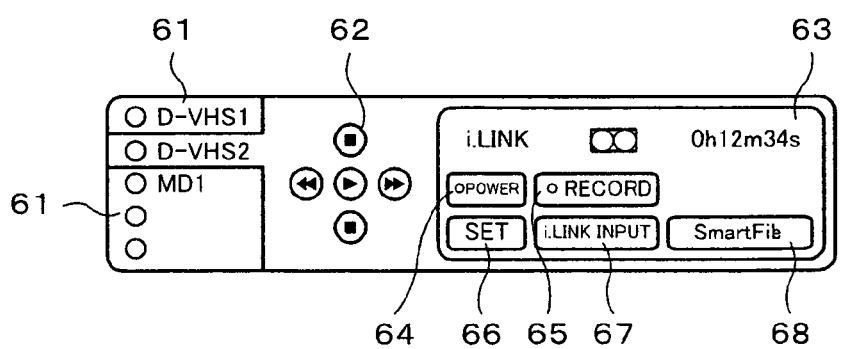
FIG. 5 is a schematic diagram of a control panel display on the IRD in a receiving system for digital satellite broadcasting to which the invention is applied.

The registered equipment can be changed by shifting the picture plane from a display of a control panel as shown in FIG. 5 to a picture plane for changing the setting by pressing a "set" button 66. In the display of the control panel, there are provided: an equipment selection display 61; a "function" button display 62; a state display 63; a "power" button 64; a "record" button 65; a "set" button 66; an IEEE 1394 input switching button 67 (IEEE 1394 is displayed as i.LINK); and a "smart file" executing button 68. Names of the five registered equipment units of IEEE 1394 are shown in the equipment selection display 61. Desired equipment which the user wants to connect to the bus of IEEE 1394 can be selected from the five equipment units by the equipment selection display 61.

When the "set" button 66 is pressed from the display of the control panel, a setting picture plane as shown in FIGS. 6A and 6B is displayed.

As shown in FIG. 6A, a registered equipment display 71, a connected equipment display 72, a "decide" button 73, and a "return" button 74 are displayed on a set changing picture plane.

Up to five equipment units to which the ID numbers were allocated as nodes of IEEE 1394 are displayed in the registered equipment display 71. The equipment displayed more brightly among them denotes the equipment physically connected to the bus. When the registered equipment is disconnected from the bus, the display of the registration name becomes dimmer. When the registered equipment is connected again to the bus, the display of the registration name becomes bright.

As for the five equipment units which are connected through the bus of the IEEE 1394 interface, five equipment units that were first connected are first automatically registered. If five equipment units have already been registered, the sixth and subsequent equipment are not registered.

In case of changing or removing the equipment which is connected through the bus of IEEE 1394, a check mark is added to a check box 72A in the connected equipment display 72. The equipment to which the check mark has been added becomes a target of registration. The equipment to which the check mark is not added is removed from a target of registration. In this instance, the equipment in which the reservation recording has been set and the connected equipment cannot be changed. This is because if the equipment in which the reservation recording has been set and the connected equipment are removed, an inconvenience such that the reservation recording cannot be performed or data cannot be transmitted occurs.

As shown in FIG. 6B, for instance, a reservation mark 75 like a clock mark is displayed on the equipment in which the reservation recording has been set. In the equipment in which the reservation mark 75 has been displayed, the check mark of the check box 72A cannot be removed.

FIGS. 7A to 7C show processes in case of changing the registered equipment and show a case where, for example, the equipment of D-VHS2 is changed to the equipment of MD3. As shown in FIG. 7A, first, a cursor is moved to a position of the equipment of D-VHS2. Subsequently, the "decide" button 73 is pressed. When the "decide" button 73 is pressed at this position, the check mark of D-VHS2 is removed as shown in FIG. 7B. After that, the cursor is moved to a position of equipment which the user wants to newly register. The "decide" button 73 is pressed at this position. Thus, the check mark is added to the position of MD3 as shown in FIG. 7C. After the check mark is changed and the setting picture plane is finished by pressing the "return" button 74 in this manner, the equipment to which the check mark has newly been added is registered.

The expression of "VHS", "MD", or the like shows the kind of equipment. When the same kind of equipment is registered, the equipment is identified by the number written after such an expression. When the registration of the equipment is changed, the number subsequent to the expression showing the kind of equipment is changed in accordance with the change.

Figure 8A:
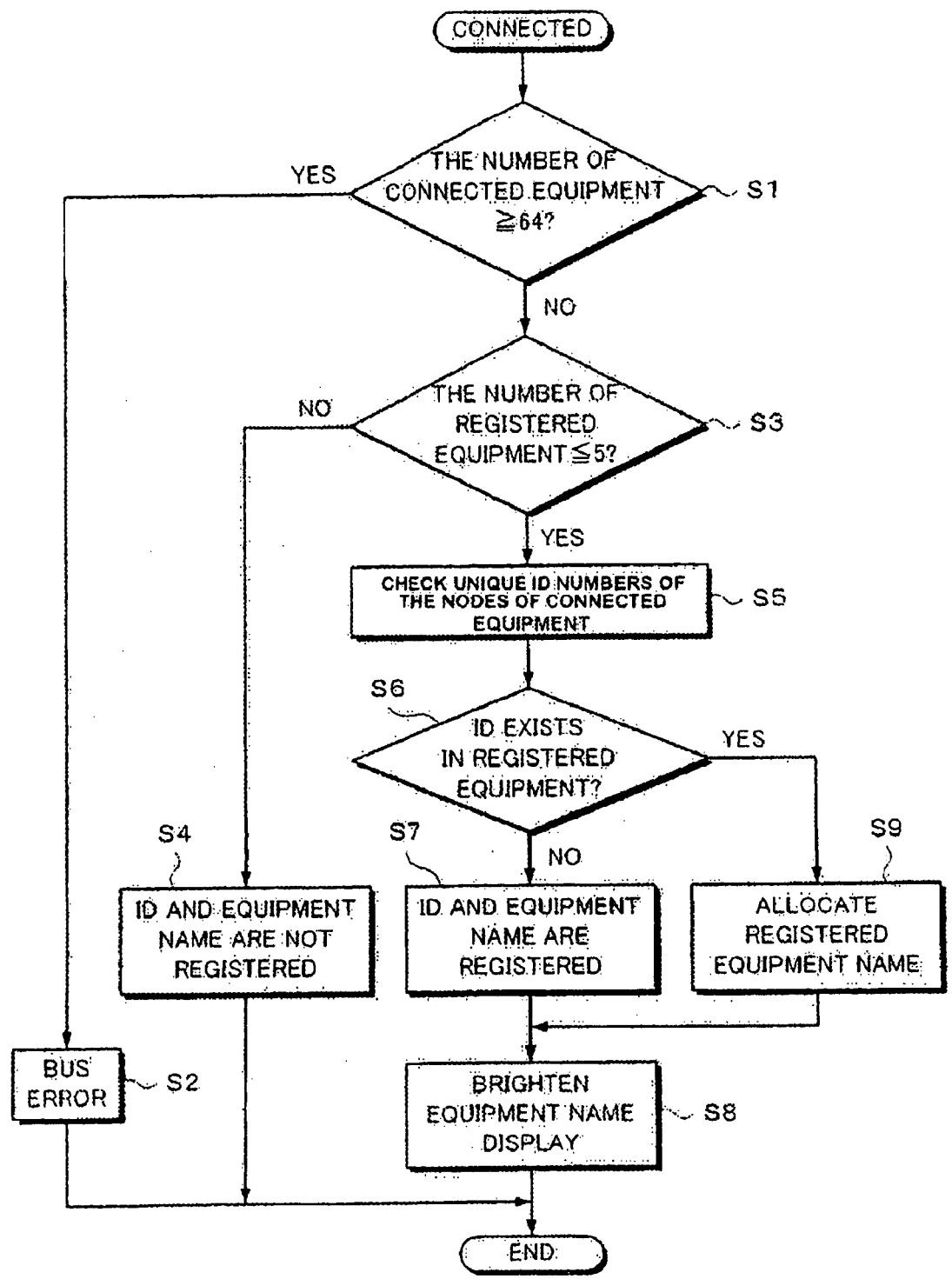

FIGS. 8A and 8B are flowcharts for performing the processes as mentioned above and show an automatic registering process of equipment. As shown in FIG. 8A, when the equipment is connected, whether the number of connected equipment is equal to or larger than 64 or not is discriminated (step S1). If the number of connected equipment is equal to or larger than 64, it is determined that there is a bus error (step S2). The processing routine is finished. If the number of equipment connected to the bus is smaller than 64 in step S1, whether the number of registered equipment is equal to or less than 5 or not is discriminated (step 3). If the number of registered equipment is larger than 5, the ID numbers of the nodes and the equipment names are not registered (step S4). The processing routine is finished.

If the number of equipment connected to the bus is equal to or less than 5 in step S3, the unique ID numbers of the nodes of the equipment connected to the bus are discriminated (step S5). The registration contents stored in the nonvolatile memory 60 are discriminated and whether there is the equipment having the ID number among the registered equipment or not is discriminated (step S6).

If the equipment having the same ID number as that of the connected equipment cannot be found among the registered equipment, the ID number and the equipment name are newly registered (step S7). This equipment name is more brightly displayed (step S8).

If the equipment having the same ID number as that of the connected equipment exists among the registered equipment, the name of the registered equipment is allocated (step S9). This equipment name is more brightly displayed (step S8).

As shown in FIG. 8B, when the connected equipment is disconnected from the bus of IEEE 1394 and enters a non-connecting state, the equipment name display is dimmed (step S10).

Figure 9:
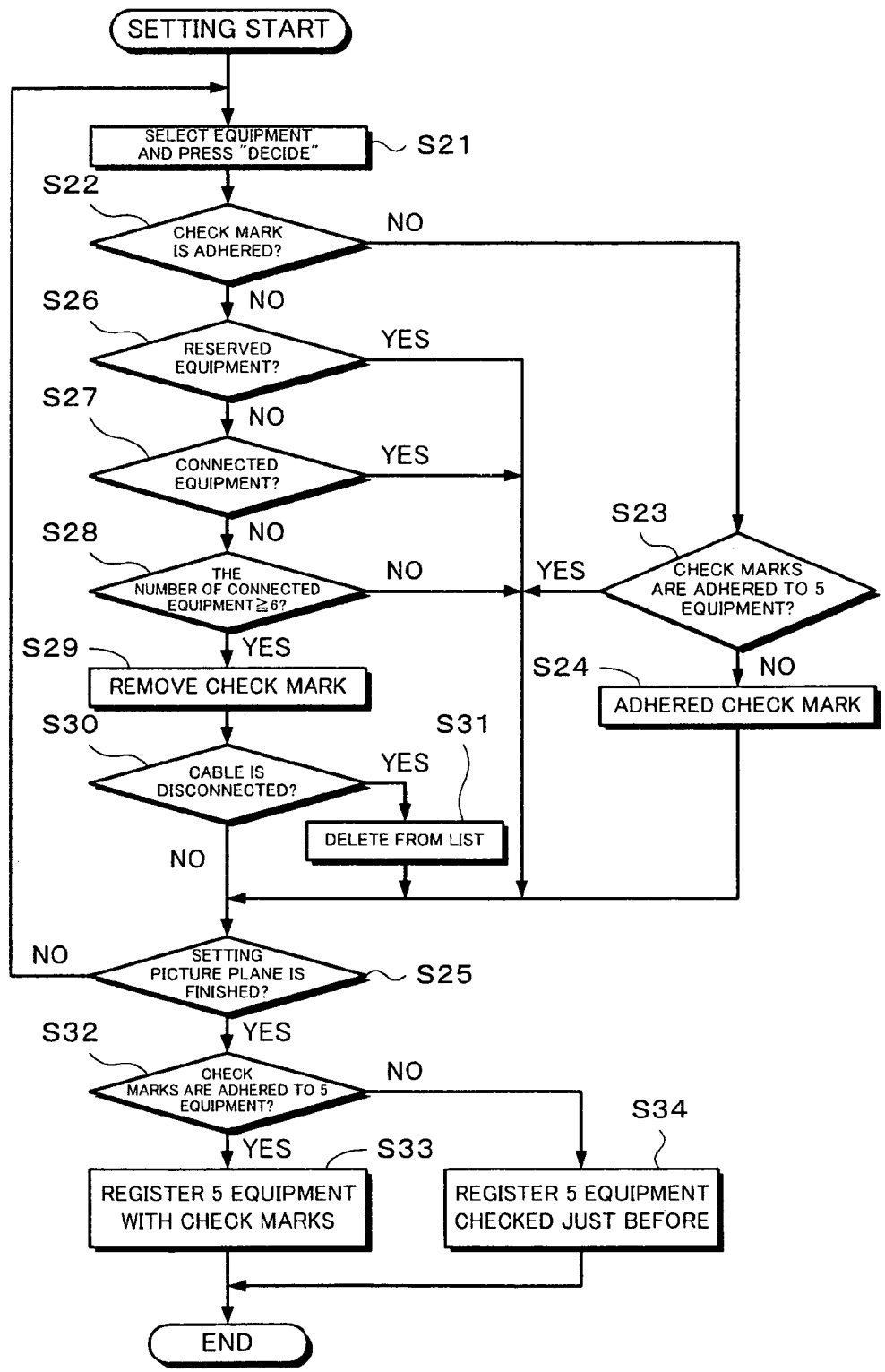
FIG. 9 is a flowchart for registration of equipment in a receiving system for digital satellite broadcasting to which the invention is applied.

FIG. 9 is a flowchart showing processes when the registered equipment is changed. In FIG. 9, when the equipment is selected and the "decide" button 73 is pressed (step S21), whether the check mark has been previously added or not is discriminated (step S22).

If the check mark was not previously added, whether the check marks have been added to five equipment or not is discriminated (step S23). If the check marks are not added to five equipment, the check marks are added to those equipment (step S24). A check is made to see if the setting picture plane is finished (step S25). If the setting picture plane is not finished, the processing routine is returned to step S21.

If it is decided in step S23 that the check marks have been added to the five equipment, the check marks are not changed but step S25 follows and whether the setting picture plane is finished or not is discriminated. If the setting picture plane is not finished, the processing routine is returned to step S21.

If it is decided in step S22 that the check marks have been previously added, whether the program reservation has been made to the equipment or not is discriminated (step S26). Since the registration is not reset in the equipment in which the program has been reserved, if it is the reserved equipment, the check marks are not changed but step S25 follows. Whether the setting picture plane is finished or not is discriminated. If the setting picture plane is not finished, the processing routine is returned to step S21.

If it is decided in step S26 that the equipment is not the reserved equipment, whether the equipment has been connected or not is discriminated (step S27). Since the registration cannot be reset in the connected equipment, in case of the connected equipment, the check marks are not changed but step S25 follows and whether the setting picture plane is finished or not is discriminated. If the setting picture plane is not finished, the processing routine is returned to step S21.

If it is determined in step S27 that the equipment is not the connected equipment, whether the number of equipment connected to the bus is equal to or larger than 6 or not is discriminated (step S28). Since up to five equipment can be registered, if six or more equipment are not connected to the bus, the check marks are not changed but step S25 follows and whether the setting picture plane is finished or not is discriminated. If the setting picture plane is not finished, the processing routine is returned to step S21.

When it is decided in step S28 that the number of connected equipment is equal to or larger than 6, the check marks are removed (step S29). Whether the cable has been disconnected or not is discriminated (step S30). If the cable is disconnected, the equipment is deleted from the list (step S31). If the cable is not disconnected, step S25 follows and whether the setting picture plane is finished or not is discriminated. If the setting picture plane is not finished, the processing routine is returned to step S21.

By the processes as mentioned above, when the equipment is selected and the "decide" button 73 is pressed, if the check marks have been added so far, the check marks are removed. If no check mark is added, the check mark is added. At this time, the reserved equipment or connected equipment is controlled so as not to remove the check mark. The number of equipment to which the check marks have been added is controlled to become 5.

When the "return" button 74 is pressed in step S25, the setting picture plane is finished and the screen is returned to the control panel. In this instance, whether the check marks have been added to the five equipment or not is discriminated (step S32). If the check marks have been added to the five equipment, the five equipment with the check marks are registered (step S33). If the check marks are not added to the five equipment, the five equipment checked just before are registered (step S34).

The IEEE 1394 channel having the ID No. "63" can be used for a case where undefined equipment is connected. In the broadcasting channel, the transport packet of MPEG and the PCM audio data can be selected. Now, assuming that the bus output of IEEE 1394 at the time of non-connection is an MPEG stream, the MPEG transport stream is transmitted by the broadcasting channel. Now, assuming that the bus output of IEEE 1394 at the time of non-connection is a PCM audio stream, the PCM audio data is transmitted by the broadcasting channel.

Figure 10:
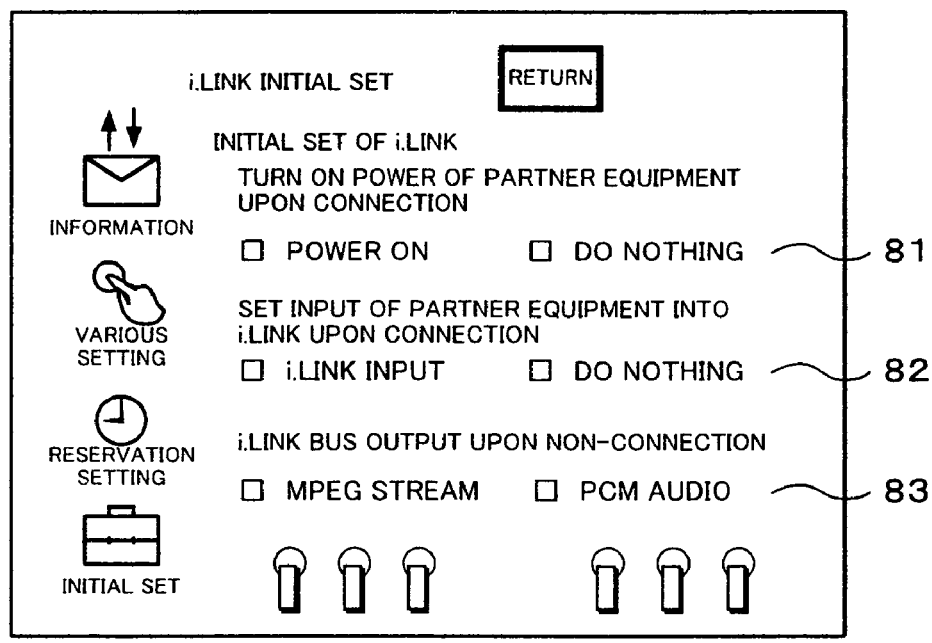
FIG. 10 is a schematic illustrating broadcasting in a receiving system for digital satellite broadcasting to which the invention is applied.

FIG. 10 shows a picture plane for initial setting of IEEE 1394. As shown in FIG. 10, a selection display 81 to discriminate whether a power source of partner equipment is turned on at the time of connection or not, a selection display 82 to discriminate whether the partner equipment is set to an IEEE 1394 input upon connection or not, and a selection display 83 to discriminate whether a bus output of IEEE 1394 upon non-connection is set to the MPEG stream or PCM audio data are displayed on the initial setting picture plane. When the MPEG stream side is selected on the selection display 82, the transport stream of MPEG is transmitted in the broadcasting channel. When the PCM audio is selected, the PCM audio data is transmitted in the broadcasting channel.

As mentioned above, the MPEG transport stream and the PCM audio data can be selected in the broadcasting channel. That is, the video data, audio data, and control data compressed by the MPEG system can be transmitted by a packet of the MPEG transport stream. Even in case of the other data, data which is multiplexed to the transport stream can be transmitted by a packet of the transport stream. Data such that a compression system differs from the MPEG system as in case of the MD recording and reproducing apparatus can be transmitted as PCM audio data.

In the system to which the invention is applied as mentioned above, the number of equipment which are connected to the bus of IEEE 1394 is limited to 5. The names of the five equipment registered are displayed on the equipment selection display 61. Desired equipment can be selected from the five equipment by the input switching button 67. The equipment to be registered can be easily changed by the setting picture plane.

Although the number of equipment of IEEE 1394 which are registered has been set to 5 in the above example, it is not limited to this value.

In the above example, when the registration of the equipment is changed, the change of the registration is inhibited in the equipment in which the program reservation has been set or the connected equipment. However, the invention is not limited to such a construction. For example, the change of the registration can be also inhibited by generating a warning display such as "The program recording reservation has been set in the equipment to be changed.", "The equipment to be changed has been connected.", or the like. Such a warning display can be merely performed without inhibiting the registration.

According to the invention, for example, five equipment are selected from the equipment connected to the interface of IEEE 1394 and the node ID numbers are allocated to the five equipment and registered. By registering them as mentioned above, even if the equipment is disconnected from the interface and connected again, the IRD can recognize the equipment. Further, a number of equipment are not arranged on the list display of the connected equipment and the equipment can be easily selected.

Among the equipment physically connected to the interface, the five equipment which were connected early are automatically registered. The registration contents can be easily changed by the user input. When the registration contents are changed, the change of registration is inhibited in the equipment in which the program reservation has been set or the connected equipment. Thus, even if the registration is changed, an erroneous operation does not occur.

The present invention is not limited to the foregoing embodiments but many modifications and variations are possible within the spirit and scope of the appended claims of the invention.

What is claimed is:

1. A receiving apparatus for receiving a digital broadcast which comprises a transport stream in which video data and audio data have been compressed and multiplexed, comprising:
    a decoder for decoding the transport stream;
    a digital interface for mutually transmitting the decoded transport stream to and receiving the decoded transport stream from digital signal processing devices; and
    a register for selecting a predetermined number of devices from among a plurality of digital signal processing devices connected to said digital interface and for allocating unique node identification numbers to said selected devices, for each of said selected devices, said register storing a record of said selected device and said unique node identification number allocated to said selected device, the record of the selected device including an equipment name of the selected device and maintaining said record regardless of whether said selected device remains connected to said digital interface.

2. An apparatus according to claim 1, wherein said register confirms whether a device connected to said digital interface has already been allocated a unique node identification number when said device is connected to said digital interface.

3. An apparatus according to claim 1, wherein said register automatically allocates the same unique node identification numbers to said selected devices when said selected devices are re-connected to said digital interface.

4. An apparatus according to claim 1, wherein said records stored in said register may be changed by user input.

5. An apparatus according to claim 1, wherein, when said unique node identification numbers have previously been allocated to said predetermined number of devices, said register prohibits cancellation of said records stored in said register.

6. An apparatus according to claim 1, further comprising a display processing circuit for displaying a list of digital signal processing devices connected to said digital interface.

7. An apparatus according to claim 6, wherein said display processing circuit is operable to visually discriminate between selected devices connected to said digital interface and selected devices not connected to said digital interface.

8. An apparatus according to claim 6, wherein, when an operation is performed to change said record of a device in which a program recording reservation has been set, said display processing circuit generates a predetermined warning display.

9. An apparatus according to claim 1, further comprising display means for displaying a selection screen to select a device from among said selected devices.

10. A method of recognizing a plurality of digital signal processing devices connected to a digital broadcast receiving apparatus through a digital interface, comprising:
    selecting a predetermined number of devices from among the plurality of digital signal processing devices connected to the digital interface; and
    registering said selected devices,
    said registering step including allocating a unique node identification number to each of said selected devices and, for each of said selected devices, storing a record of said selected device and said unique node identification number for said selected device regardless of whether said selected device remains connected to the digital interface the record of the selected device including an equipment name of the selected device.

11. A method according to claim 10, wherein said registering step further includes confirming whether a device connected to the digital interface has already been associated with a unique node identification number.

12. A method according to claim 10, wherein said registering step further includes automatically allocating the same unique node identification numbers to said selected devices when said selected devices are reconnected to said digital interface.

13. A method according to claim 10, wherein said registering step further includes determining said unique node identification number allocated to said selected device based on a user input.

14. A method according to claim 10, wherein said registering step further includes prohibiting cancellation of said stored records.

15. A method according to claim 10, further comprising displaying a list of digital signal devices connected to said digital interface.

16. A method according to claim 15, wherein said displaying step includes visually discriminating between selected devices connected to the digital interface and selected devices not connected to the digital interface.

17. A method according to claim 15, wherein said displaying step further includes generating a predetermined warning display when a change is made to said record of a device in which a program recording reservation has been set or a node identification number has been allocated.

18. A method according to claim 10,
    further comprising displaying a selection screen that allows selection of devices from among said selected devices.

* * * * *